May 6, 1930.  A. W. LA FORGE  1,757,201
HAND RAKE
Filed Nov. 27, 1928
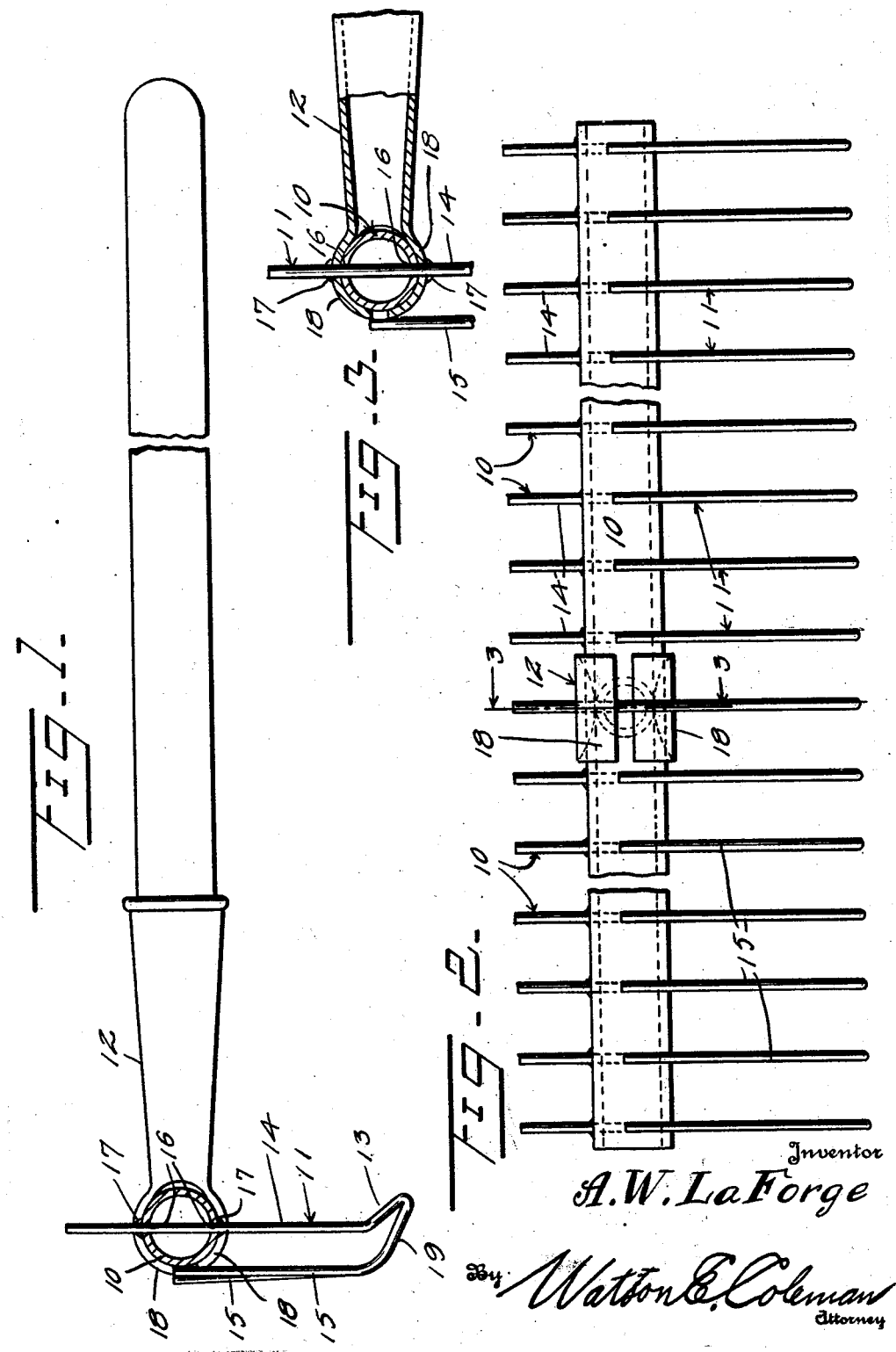

Patented May 6, 1930

1,757,201

UNITED STATES PATENT OFFICE

ALBERT W. LA FORGE, OF CHINO, CALIFORNIA

HAND RAKE

Application filed November 27, 1928. Serial No. 322,191.

This invention relates to hand rakes and more particularly to an apparatus of this character, which is so constructed that it is capable of use in heavy work as, for example, that of gathering walnuts or other nuts into piles in the field.

A further object of the invention is to produce a rake of this character so constructed that the greatest available space is left between the teeth thereof, so that in the use above specified, the collection of dirt and the like will be eliminated in so far as possible.

A still further object of the invention is to provide for economic production of a rake of this character by the use of wire in the formation of the rake teeth.

These and other objects I attain by the construction shown in the accompanying drawing, wherein for the purpose of illustration is shown a preferred embodiment of my invention and wherein:—

Figure 1 is a vertical longitudinal sectional view through a rake constructed in accordance with my invention;

Figure 2 is a front elevation of the rake;

Figure 3 is a section on the line 3—3 of Figure 2.

Referring now more particularly to the drawing, the numeral 10 generally designates a cross bar, 11 teeth secured thereto and 12 a handle receiving socket secured to the cross bar. These elements comprise the head of the rake. The cross bar may be of any suitable character but is preferably a metallic tube. The teeth 11 each comprise a V-shaped foot 13, the ends of the arms of which have long and short parallel extensions 14 and 15 which are disposed in the same general plane as the foot 13, but are angularly related thereto in such fashion that when these arms are vertically disposed, the foot inclines forwardly and downwardly therefrom. These arms are attached by forming through the cross bar openings 16 through which the longer arms are directed until the upper ends of the shorter arms engage against the face of the cross bar. Each arm 14 and 15 is welded to the bar at each accessible point of contact therewith, as indicated at 17.

The handle socket 12 is in the form of a truncated cone, the smaller end of which is split to form lips 18 embracing the bar 10 and these lips are welded to the bar. To additionally secure the socket, the openings for the reception of the longer arm of one of the teeth are formed not only through the bar but through the lips, as more clearly shown in Figure 3, thus providing a very firm anchor for the socket.

It will be obvious that each of the rake teeth 11 will be very rigid and, at the same time, will be very thin, so that little resistance will be provided for the passage of smaller objects than it is desired to collect and a greater proportion of such smaller objects will pass therebetween.

In operation, the rake will slide upon the heel 19 on the foot 13, so that it will have no tendency to dig into the ground in its passage thereover. In construction, the longer extensions 14 are preferably continued through the cross bar to the opposite face thereof where they form relatively short teeth after the manner of the usual teeth provided at the back of the head of wire tooth rakes.

Since the construction employed is obviously capable of a certain range of change and modification without materially departing from the spirit of the invention, I do not limit myself to such specific structure except as hereinafter claimed.

I claim:—

In a rake, a socket, a cross bar mounted on the socket, and a plurality of tines on said cross bar, said cross bar having spaced openings therethrough, said tines comprising a V-shaped wire foot, an inner arm upstanding from said foot and being adapted to extend upwardly through the openings in said cross bar, an outer arm upstanding from said foot, said outer arm being adapted to be secured to said cross bar at the forward edge thereof, said outer arm being arranged in parallel relation to said inner arm and providing a brace for said inner arm, said socket having forwardly extending spaced lip members for engaging the cross bar and being provided with openings therethrough for engaging one of said tines whereby to prevent turning of the cross bar between the lips.

In testimony whereof I hereunto affix my signature.

ALBERT W. LA FORGE.